(12) United States Patent
Bienzobás Saffie

(10) Patent No.: US 9,862,145 B2
(45) Date of Patent: Jan. 9, 2018

(54) SYSTEM AND TWO DIMENSIONAL PRINTING METHOD IN A THREE DIMENSIONAL PRINTING SUPPORT

(76) Inventor: Fernando Andrés Bienzobás Saffie, Santiago (CL)

( * ) Notice: Subject to any disclaimer, the term of this patent is extended or adjusted under 35 U.S.C. 154(b) by 786 days.

(21) Appl. No.: 13/817,762

(22) PCT Filed: Aug. 18, 2011

(86) PCT No.: PCT/CL2011/000047
§ 371 (c)(1),
(2), (4) Date: Apr. 2, 2013

(87) PCT Pub. No.: WO2012/022006
PCT Pub. Date: Feb. 23, 2012

(65) Prior Publication Data
US 2013/0208066 A1 Aug. 15, 2013

(30) Foreign Application Priority Data
Aug. 19, 2010 (CL) .................................. 884-2010

(51) Int. Cl.
*B29C 67/00* (2017.01)
*B44F 1/06* (2006.01)
(Continued)

(52) U.S. Cl.
CPC .............. *B29C 67/00* (2013.01); *B29C 64/00* (2017.08); *B41M 3/00* (2013.01); *B44C 3/10* (2013.01);
(Continued)

(58) Field of Classification Search
CPC ... Y10T 428/24802; B44C 3/10; B44C 3/123; B44F 1/06; B44F 1/063
See application file for complete search history.

(56) References Cited

U.S. PATENT DOCUMENTS 1,994,204 A 3/1932 Walls
3,993,813 A * 11/1976 Grieco .................... B44F 1/063
264/158

(Continued)

FOREIGN PATENT DOCUMENTS

CN 200987540 Y 12/2007
CN 101762885 A 6/2010
(Continued)

OTHER PUBLICATIONS

International Search Report, PCT/CL2011/000047 dated Jan. 16, 2012.

*Primary Examiner* — Gerard Higgins
(74) *Attorney, Agent, or Firm* — Arent Fox LLP

(57) ABSTRACT

The invention relates to a 2D printing method on a 3D printing support, consisting of forming a printing support comprised of a plurality of colored fibers that follow a printing pattern, which once joined and shaped into a block, can be transversally cut, thereby obtaining printed sheets according to said printing pattern. The invention further relates to the printing support, comprised of a block (1), wherein in one embodiment same is composed of a plurality of hollow tubes (2) having a cavity that can be filled with a coloring means and in another embodiment same is composed of solid tubes. After the coloring means hardens and the block (1) solidifies, the latter can be transversally cut parallel to the printing face (4) into a plurality of strips (5) that will depend on the required volume of advertising signs, posters or banners, among others.

4 Claims, 21 Drawing Sheets

(51) Int. Cl.
    *B41M 3/00*         (2006.01)
    *B44C 3/10*         (2006.01)
    *B44C 3/12*         (2006.01)
    *B44C 5/04*         (2006.01)
    *B29C 64/00*       (2017.01)
    *B33Y 80/00*       (2015.01)

(52) U.S. Cl.
    CPC ............ *B44C 3/123* (2013.01); *B44C 5/0453* (2013.01); *B44F 1/06* (2013.01); *B33Y 80/00* (2014.12)

(56) References Cited

U.S. PATENT DOCUMENTS

| | | | | |
|---|---|---|---|---|
| 4,085,181 | A | * | 4/1978 | Cosentino ................... 264/158 |
| 4,276,253 | A | * | 6/1981 | Adler et al. ................. 264/247 |
| 4,351,680 | A | * | 9/1982 | Kohn ............................. 156/79 |
| 4,430,789 | A | * | 2/1984 | Wu ............................. 29/527.1 |
| 4,474,841 | A | | 10/1984 | Kerekes |
| 4,499,611 | A | * | 2/1985 | Davis ................................ 2/169 |
| 5,492,659 | A | * | 2/1996 | Collepardi ...................... 264/82 |
| 2010/0178448 | A1 | | 7/2010 | Nakajima |
| 2010/0308081 | A1 | | 12/2010 | Waitz |

FOREIGN PATENT DOCUMENTS

| | | |
|---|---|---|
| DE | 82813 | 1/1895 |
| DE | 3841141 A1 | 6/1990 |
| DE | 202008002080 U1 | 8/2009 |
| EP | 1456030 A1 | 9/2004 |
| ES | 2188425 A1 | 6/2003 |
| JP | S52-96166 | 8/1977 |
| JP | S5611214 A | 2/1981 |
| JP | H0420655 A | 1/1992 |
| JP | H04139083 A | 5/1992 |
| JP | 2010-121945 A | 6/2010 |
| JP | 3163687 U | 10/2010 |
| KR | 970010275 B1 | 6/1997 |
| WO | WO 2005/051661 A1 | 6/2005 |

\* cited by examiner

SYSTEM AND TWO DIMENSIONAL PRINTING METHOD IN A THREE DIMENSIONAL PRINTING SUPPORT

CROSS-REFERENCE TO RELATED APPLICATIONS

This application is a National Stage entry of International Application No. PCT/CL2011/000047, filed Aug. 8, 2011, which claims priority to Chilean Application No. 884-2010, filed Aug. 19, 2010. The disclosures of the prior applications are hereby incorporated in their entirety by reference.

FIELD OF THE INVENTION

The present invention relates to a system and a two-dimensional (2D) printing method in a three-dimensional (3D) printing support, consisting of forming a printing support comprised of a plurality of colored fibers or tubular cavities to be colored, which follow a printing pattern, which, once joined and shaped into a block can be transversally cut obtaining printed sheets according to said printing pattern.

BACKGROUND OF THE INVENTION

In order to print a great volume of posters, placards and advertising banners among many others, on a previously selected material acting as a two-dimensional (2D) support, large size machines are generally used having different types of printing means, which inject or impregnate ink or other coloring medium utilized in traditional offset, serigraphy or digital printing. These printing methods are well known in the art.

When great volume impressions are required, these machines are usually utilized full time, working day and night in order to achieve the requested printing volume.

The present invention proposes a different printing manner, consisting of a system and a two-dimensional printing method, which uses a three-dimensional printing support, which consists of forming a printing support comprised of a plurality of colored fibers or tubular cavities to be colored, which follow the required printing pattern. Once said colored fibers or tubular cavities have been filled with different colors according to the pattern defined for the impression, a three-dimensional block is generated, leaving the printed face as front face of the block, so that when making a plurality of crosswise cuts in said block, parallel to the front face, a plurality of printed sheets containing said printing pattern is obtained.

In the state of the art there are several patent documents teaching different printing forms. For example, document CA 2685673 (Gregory) published on Nov. 13, 2008, discloses one or more types of ink retaining layers for a one-way vision display panel and associated methods. In an example, a screen includes a perforated panel formed of a flexible material. The perforated panel has a front surface, a rear surface and a plurality of perforations extending from the front surface to the rear surface. An ink layer is retained and located in the perforated panel. The ink retention means includes the material that retains or absorbs the residual ink from an application of the printed image on the front surface of the perforated panel. The vision is in only one sense of the panel, and it can also include a releasing layer or a backing layer, or both things.

Document EP 1456030 (Lorch et al) published on Sep. 15, 2004, discloses a method for producing rotogravure shapes and the use of these rotogravure shapes. According to this document, there is provided a substrate having a plurality of cavities, and structures comprised by at least a removable illustration material are produced at the bottom, so as to form castings corresponding to the tonal values of the image to be printed, wherein at least a low viscosity precursory liquid of the illustration material is introduced into the castings by an ink injection device, which solidifies to form the illustration material. The invention also relates to the rotogravure shapes comprised of a substrate having a web of holes and with the structures, which are produced in the holes to form castings corresponding to the tonal values of the copy configuration and which are made of a removable illustration material. The invention relates to the use of a rotogravure shape of the above mentioned type, by means of which the shape is comprised of a printing ink that has no influence on the illustration material, the illustration material is printed and the shape is not physically nor chemically eliminated after the illustration material is printed.

Document US 2005/0188868 (Beisswenger) published on Sep. 1, 2005, discloses an engraving method with cups that accepts the printing ink in a surface of printing cylinders specified for rotogravure. The engraving is executed such that the cups are formed from a predetermined number of points of the engraved image.

Document ES 2188425 (Rojo) dated Jun. 16, 2003, discloses a matrix panel for road signs. Said panel comprises a support provided with a plurality of through holes disposed according to a regular matrix and presenting in the interior thereof light leading means which access them through collectors and reach the observer through diffusers. With the objective of configuring a concrete signal a mask can be provided on the front face of the support, which can be associated with filters when the use of color becomes necessary.

None of the above described documents discloses a system and a two-dimensional printing method in a three-dimensional printing support, wherein once it is printed, said three-dimensional support can be transversally cut, obtaining printed sheets much faster than conventional systems known up to date.

SUMMARY OF THE INVENTION

The present invention relates to a system and a two-dimensional (2D) printing method in a three-dimensional (3D) printing support, consisting of forming a printing support comprised of a plurality of colored fibers or shallow tubes to be colored, that follow a printing pattern, which once joined and shaped as a block, when transversally cut, printed sheets containing said printing pattern are obtained.

In one of the embodiments of this invention, the printing support is formed by a block, which comprises a plurality of hollow tubes, wherein each hollow tube has a cavity, which is filled with a coloring medium, such as ink or the like, preferably of the paste type, acrylic paints, colored polymers among others, which flows into said cavity, such that when said coloring medium becomes dry, the block becomes solid. The filling with the coloring medium into each of the hollow tubes follows a printing pattern, previously established for the front face of the block.

After the coloring medium becomes hard and the block is solidified, it can be transversally cut parallel to the printing face, in a plurality of strips that will depend on the required volume of posters, placards and advertising banners. It can also be cut into panels of different thickness, for the construction of an exhibition stand or an advertising stand or other structure.

In another embodiment of the invention, the hollow tubes can be replaced by solid tubes, the colors of which are previously selected according to the printing pattern and are grouped according to said pattern.

BRIEF DESCRIPTION OF THE FIGURES

The accompanying drawings are included for providing a better understanding of the invention, they constitute part of this description and of some of the preferred embodiments.

DETAILED DESCRIPTION OF THE INVENTION

The present invention relates to a system and a two-dimensional (2D) printing method in a three-dimensional (3D) printing support, which consists of forming a printing support made of a plurality of colored fibers that follow a printing pattern, which once joined and shaped into a block can be transversally cut, thereby obtaining printed sheets according to said printing pattern.

Figure 1:
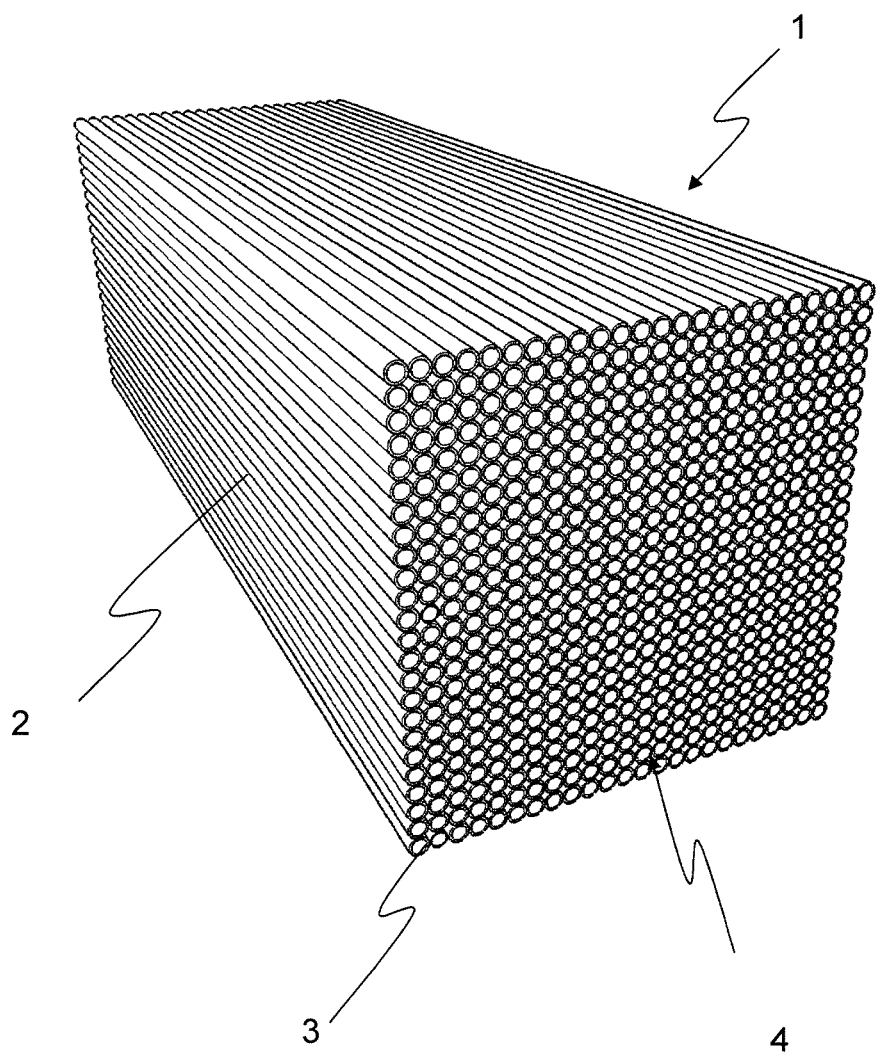
FIG. 1 shows a perspective view of the block support in 3D, which is printed in 2D.
Figure 2:
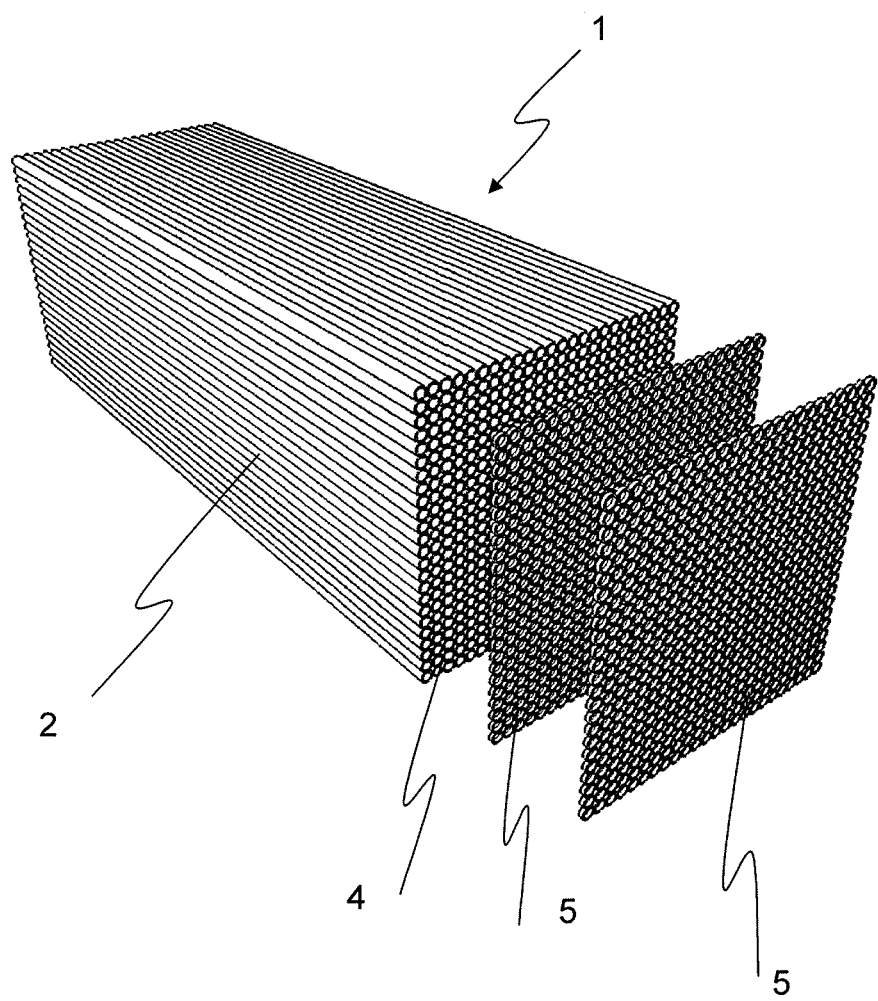
FIG. 2 shows the cross sectional cuts that are made on the block of FIG. 1.

In a first embodiment of the invention, according to what is illustrated in FIGS. 1 and 2, said printing support is formed of a block (1) which comprises a plurality of hollow tubes (2), wherein each hollow tube (2) has a cavity (3), which is filled with a coloring medium (6), such as ink or the like, preferably of the paste type, which flows into said cavity (3) so that when the coloring medium gets dry, the block (1) becomes solid. Each cavity acts as a support for the coloring medium. The filling with the coloring medium (6) into each of the hollow tubes (2) follows a printing pattern, previously established for the front face (4) of the block (1).

After the coloring medium becomes hard and the block (1) is solidified, it can be transversally cut parallel to the printing face (4) in a plurality of strips (5) that will depend on the required volume of posters, placards or aedvertising banners, among others.

Figure 3:
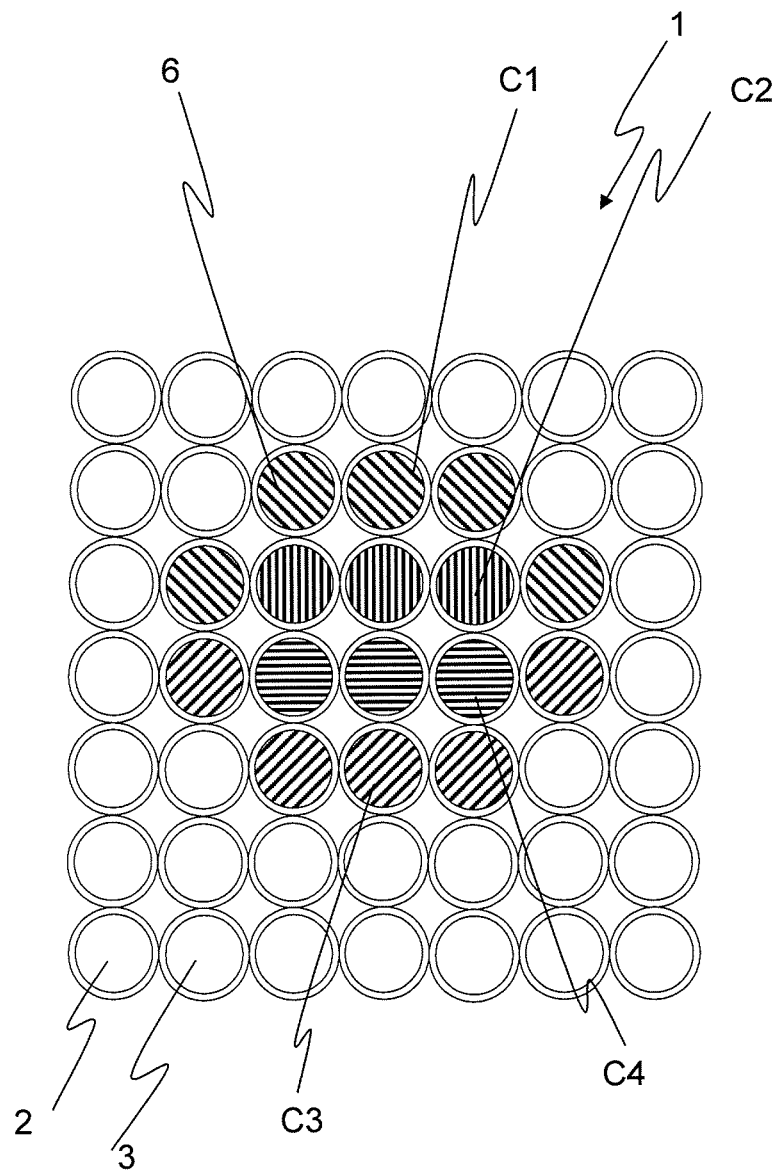
FIG. 3 shows the hollow tubular elements forming the block of this invention, which are filled with ink.
Figure 4:
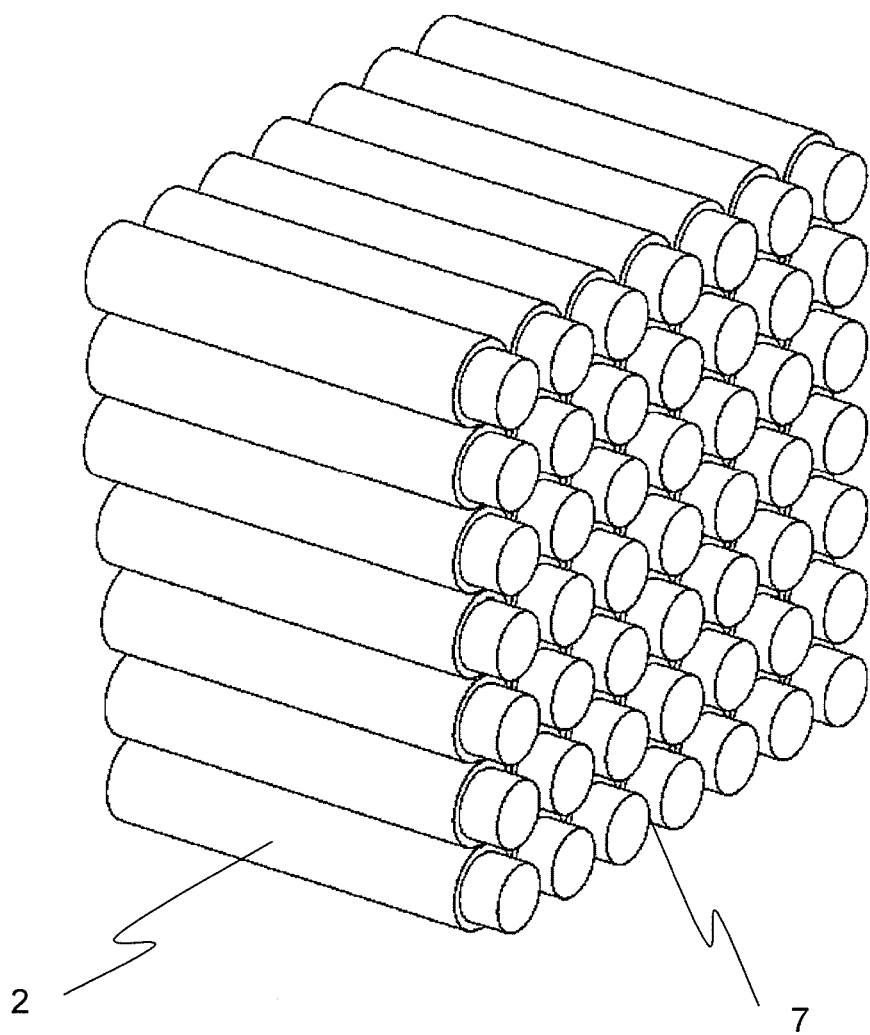
FIG. 4 shows the hollow tubular elements forming the block of this invention, which are filled with an absorbing medium, for absorbing ink.
Figure 5:
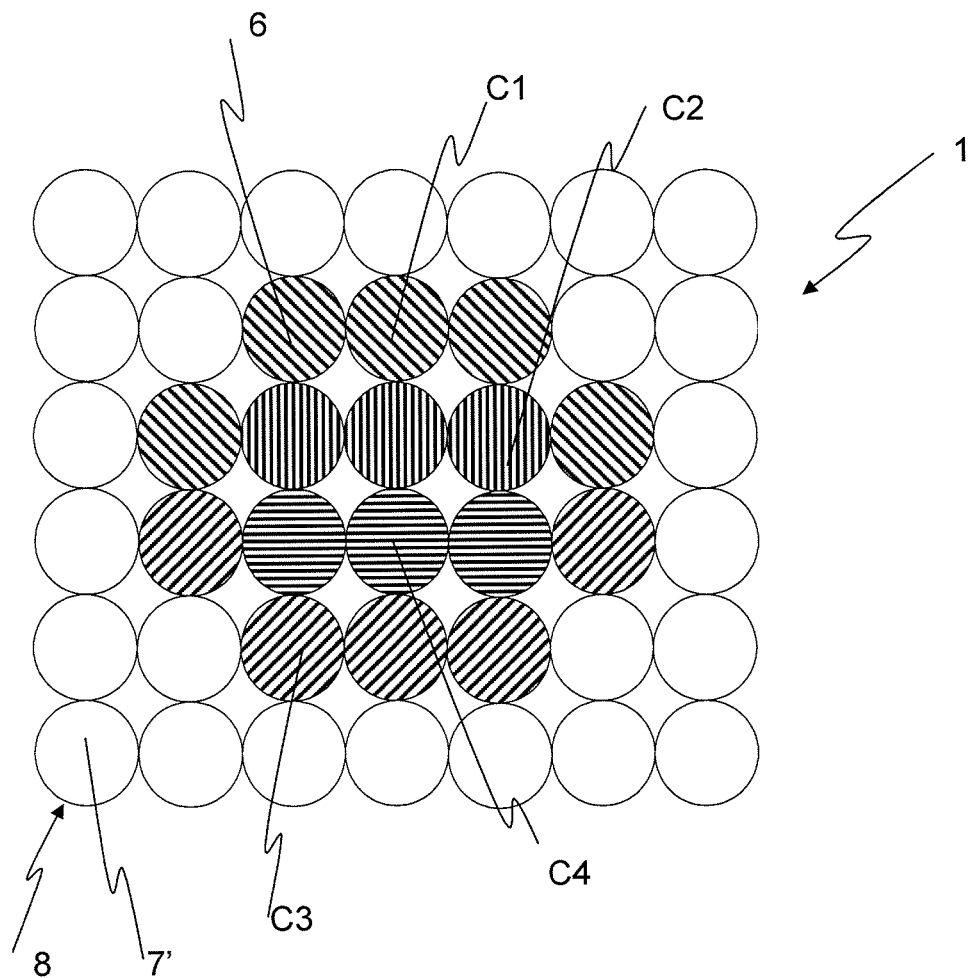
FIG. 5 shows a second embodiment of this invention, wherein the tubular elements forming the block of the present invention are solid and are previously colored.

The hollow tubes (2) are filled with the coloring medium (6), the color of which can vary for each cavity (3). As illustrated in FIG. 3, first cavities (3) are filled with one color (C1), second cavities (3) are filled with one color (C2), third cavities (3) are filled with one color (C3), and fourth cavities (3) are filled with one color (C4). This filling with different colors into the different cavities (3) of the front printing face (4) of the block (1) continues until said colors conform the predefined pattern for said front printing face (4). Each cavity (3) can be homologated to a printing "pixel", which could follow the same printing pattern of a conventional printer. The color of the coloring medium (6) can vary for each cavity (3) filled so as to generate a printing pattern, or otherwise, it can be maintained in a group of cavities (3) to generate a bigger pixel.

This is based on traditional offset, serigraphy or digital printing, wherein cyan, magenta, yellow and black (CMYK), also called four color print, combine their pigmentation to generate all the desired colors. On observing a printing with a magnifying glass or a threadcounter, only four colors will be seen in the support, but looking from a farther distance they become fused at sight and hundreds of colors will appear.

Some serigraphs even have a big enough grain, wherein it is possible to observe at a glance the CMYK sets of dots of approximately 1 mm each.

In the case of the present invention, a traditional chromatics like CMYK can be obtained by filling the cavities (3) with different proportions and locations, generating, as a result, many colors seen from a distance, similar to conventional printing.

In one of the embodiments of the present invention, the strips (5) can have a large size, such as for example, gigantographs, wherein the coloring medium (6) utilized in the block (1) has the colors (C1, C2, C3, C4), which can be associated with the basic colors in different color densities by number of cells, thereby, with said densities it is obtained the desired color of a pixel of the printing pattern.

In another embodiment of the invention, the hollow tubes (2) have inside the cavity (3) an absorbent medium (7), such that said coloring medium (6), when being in liquid form, flows through said absorbent medium (7) through all the interior of the hollow tube (2), by the effect of capillarity or absorption. The hollow tubes (2) can be filled with fiber, sponge or the like.

In another embodiment of the invention, the hollow tubes can be replaced by solid tubes (8), the cross section of which (7') is already colored with some of the colors (C1, C2, C3, C4) which are previously selected according to the printing pattern and grouped according to said pattern. Said cross section (7') is equivalent to a support for the coloring medium (6) that bears the colors (C1, C2, C3, C4).

The hollow tubes (2), as well as the solid tubes (8), hereinafter generically termed as tubes (2, 8), can have varied shapes and arrangements.

Figure 6:
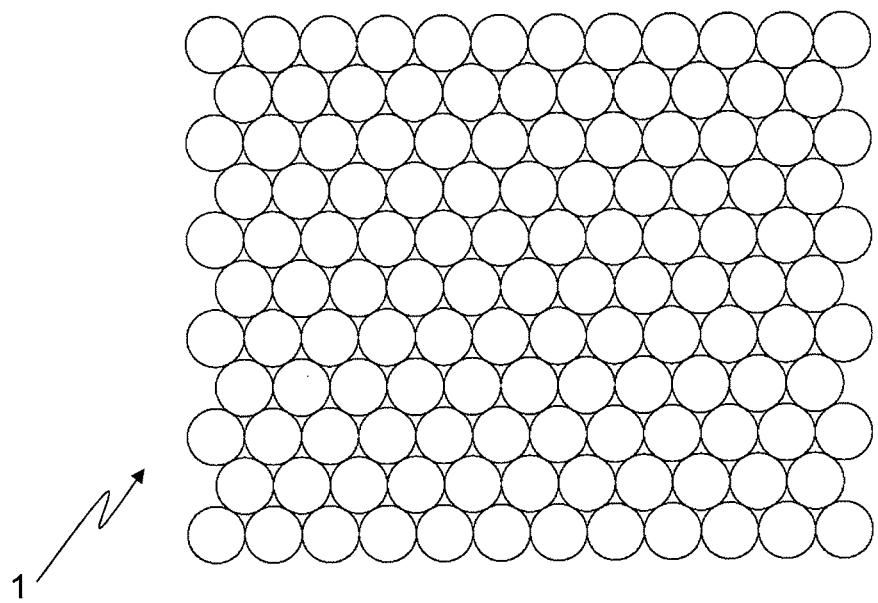
FIG. 6 shows a first distribution mode in the cross section of the tubular elements forming the block of the present invention.
Figure 7:
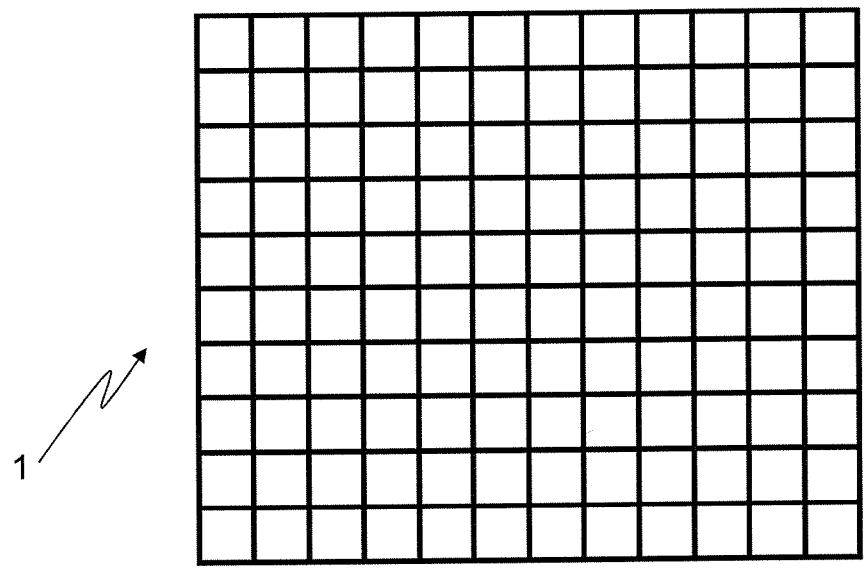
FIG. 7 shows a second distribution mode in the cross section of the tubular elements forming the block of the present invention.
Figure 8:
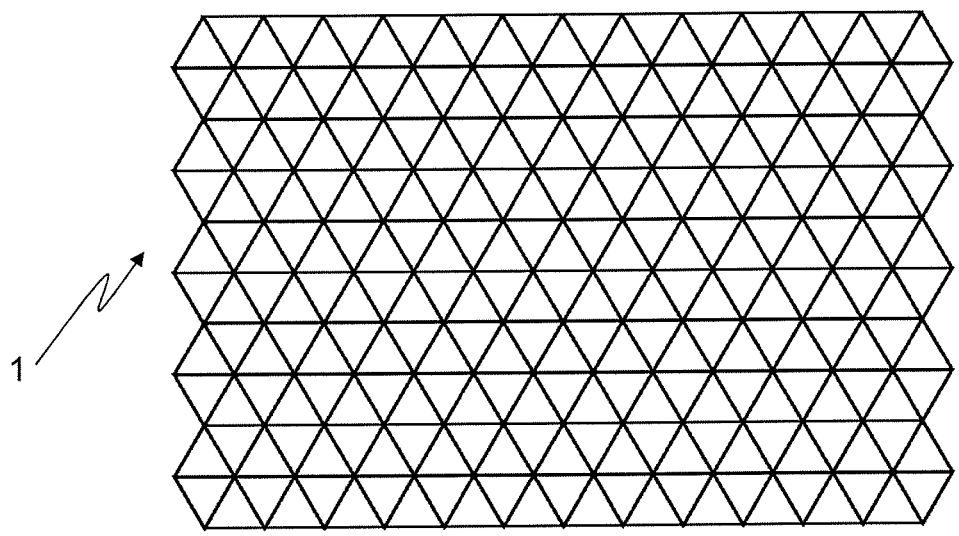
FIG. 8 shows a third distribution mode in the cross section of the tubular elements forming the block of the present invention.
Figure 9:
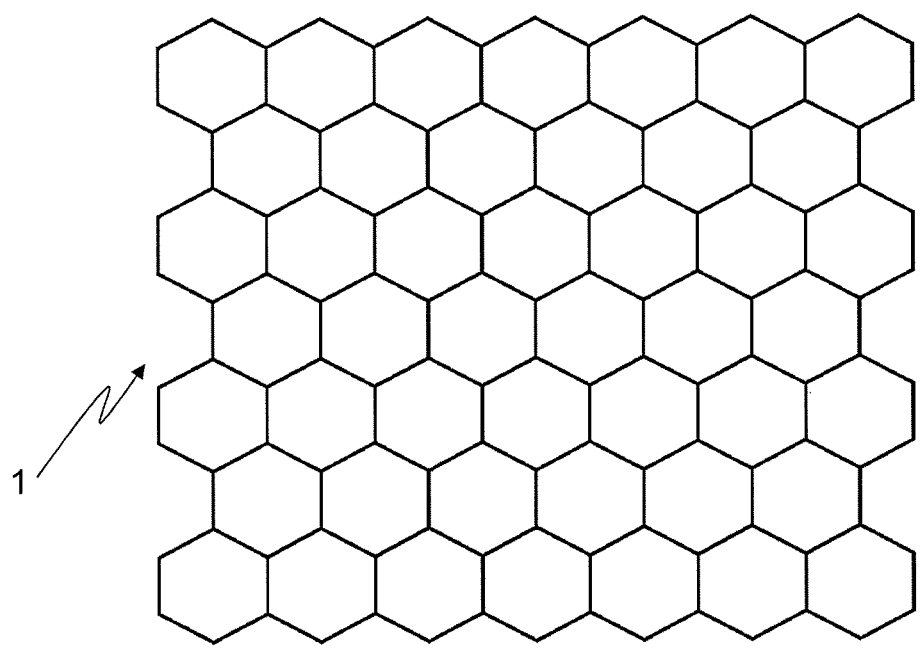
FIG. 9 shows a fourth distribution mode in the cross section of the tubular elements forming the block of the present invention.
Figure 10:
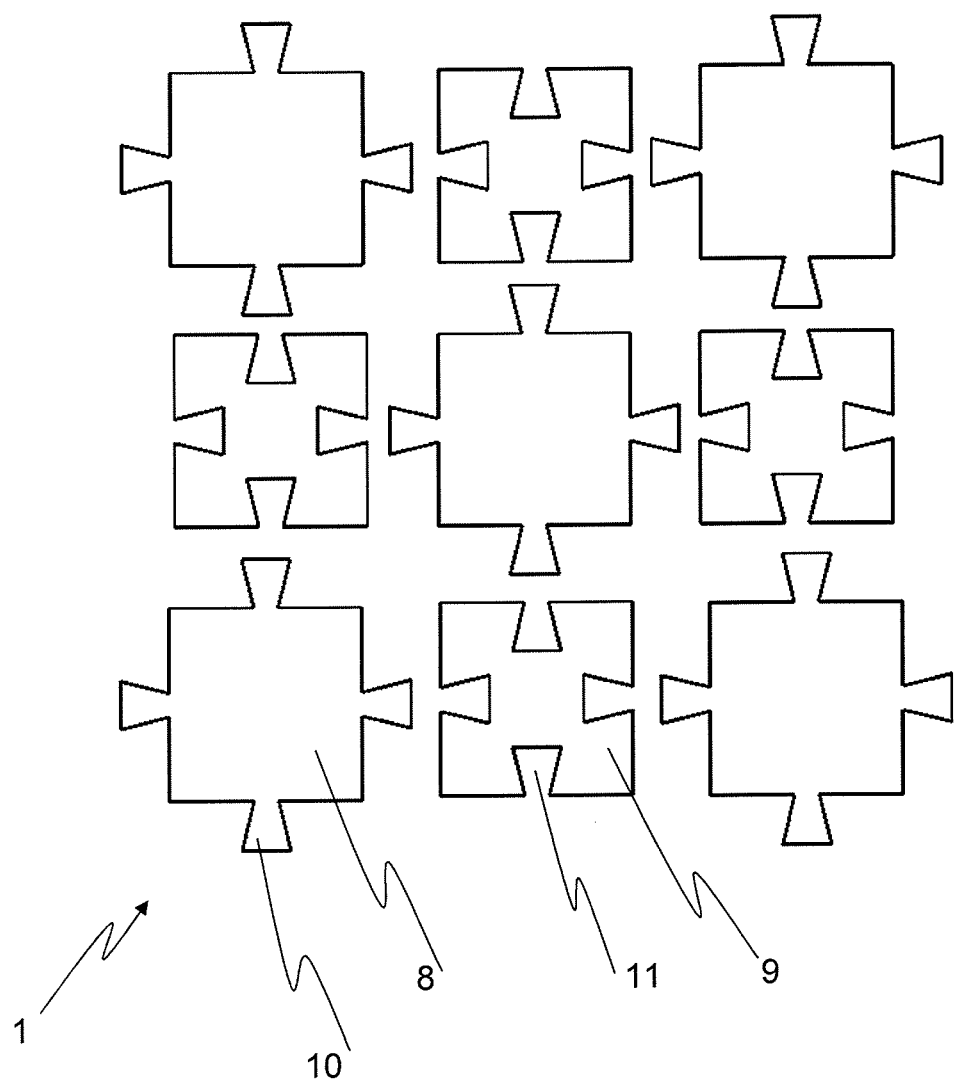
FIG. 10 shows a fifth distribution mode, with tongue and groove means, in the cross section of the tubular elements forming the block of the present invention.
Figure 11:
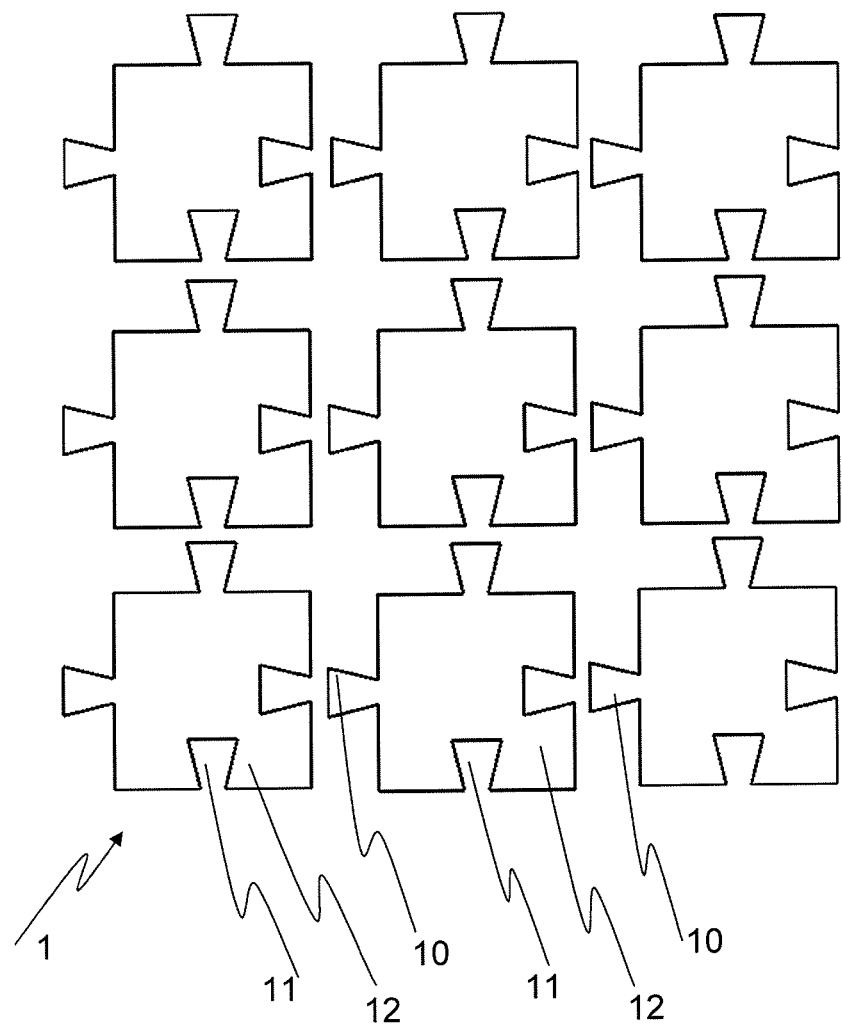
FIG. 11 shows a sixth distribution mode, with tongue and groove means, in the cross section of the tubular elements forming the block of the present invention.

In FIG. 6, the block (1) is formed of tubes (2, 8) having a circular section. The lines that form the block (1) are overlapped with respect to each other, reducing the interstice generated between circle and circle, as shown in FIGS. 1 to 5. In FIG. 7, the block (1) is formed of tubes (2, 8), the section of which is square, one tube being disposed over the other, generating a layout of aligned columns and rows. In FIG. 8, the block (1) is formed of tubes (2, 8) the section of which is triangular. In FIG. 9, the block (1) is formed of tubes (2, 8) the section of which is an hexagon, forming a front print face (4) in the shape of a honeycomb. In FIG. 10, the block (1) is formed of two types of tubes (2, 8), wherein a first male tube (8) has a preferably square section, having on each side of said square, male engaging means (10); and wherein a second female tube (9) has a preferably square section, having on each side of said square, female engaging means (11). In this case, on the four faces of each male tube (8) are mounted four female tubes (9), utilizing for that purpose the male means (10) and the female means (11) of each tube (8, 9). In FIG. 11, the block (1) is formed by a single type of tube (2, 8), wherein said tube is a male-female tube (12) having a preferably square section, having on two adjacent sides or on two opposite sides, male engaging means (10); and on the two corresponding adjacent contrary sides or on the corresponding opposite contrary sides, having female engaging means (11). In this case, the male-female tubes (12) are mounted one over the other and one next to the other.

Figure 12:
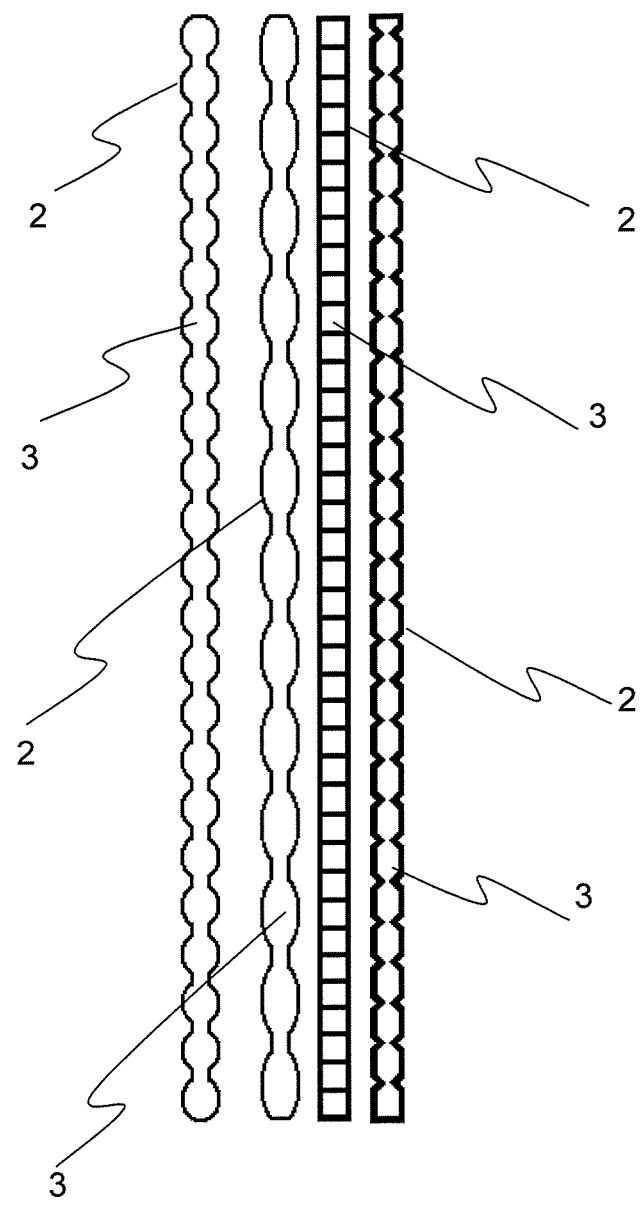
FIG. 12 shows some examples of a column of the tubular means forming the block of the present invention, the varieties of which are oriented to mark cutting zones.
Figure 13:
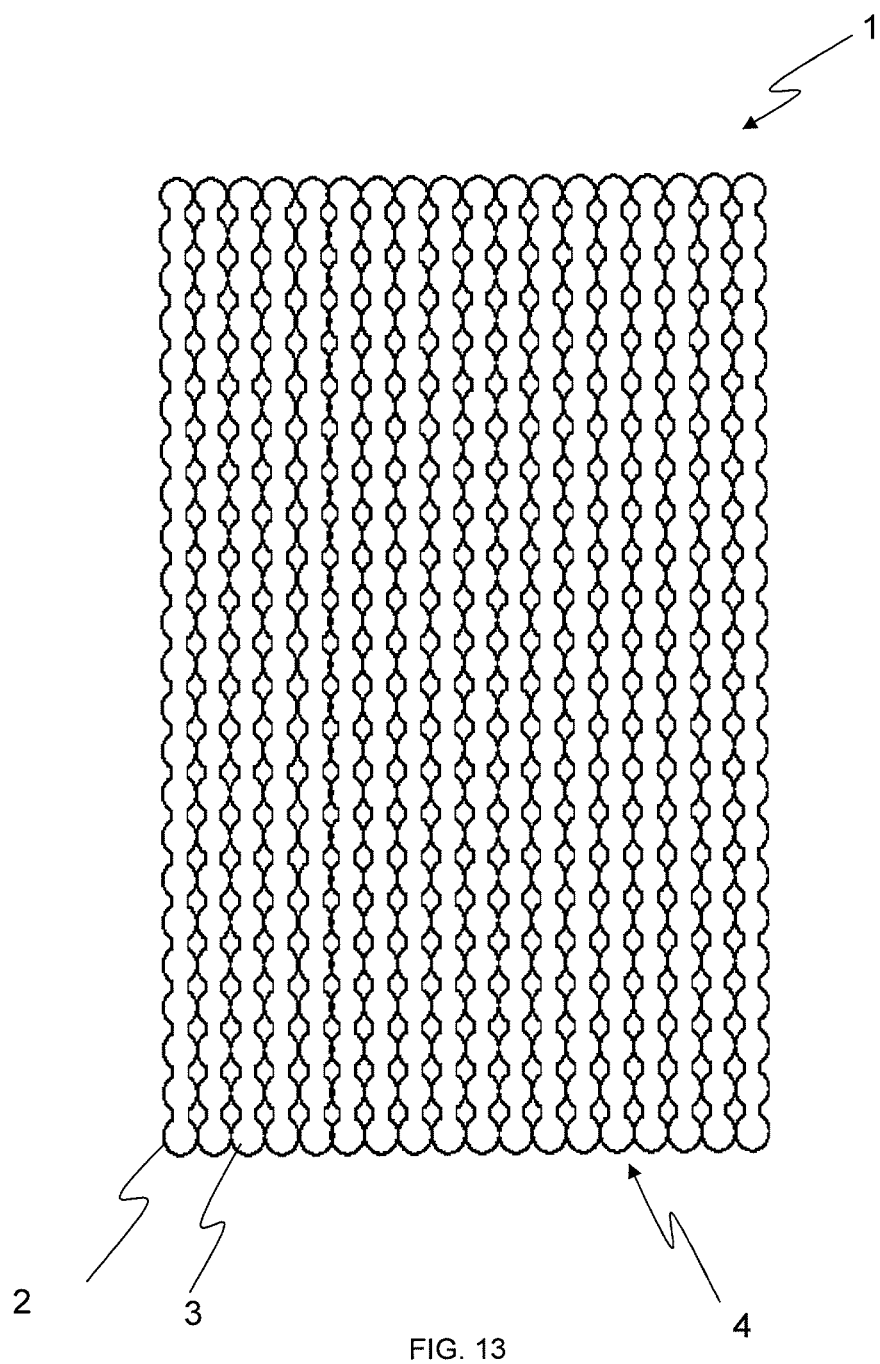
FIG. 13 shows a plurality of columns of one of the tubular means forming the block of the present invention, shown in FIG. 13.

For the case of the hollow tubes (2), they can be formed in a single block (1), ready to be filled with the coloring medium (6). In FIG. 12 are illustrated four examples of a column of tubular means, wherein each hollow tube is joined one over the other, forming a single assembly, and in FIG. 13 is illustrated the complete block (1), formed by the first example shown in FIG. 12.

Due to the foregoing, the 3D printing means can be prefabricated and previously joined before being filled with the coloring medium (6).

The preferred materials can be polymers, cellulose or the like.

In another embodiment of the invention, the hollow tubes (2) or the solid tubes (8) can be joined with adhesive, thermal fusing or ultra frequency, among other systems known in the art.

Figure 14:
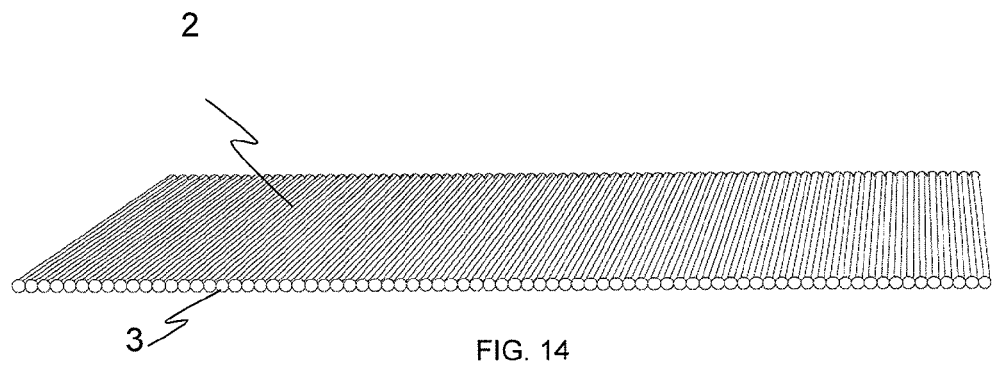
FIG. 14 shows a linear arrangement of the tubular elements for forming a printing block.
Figure 15:
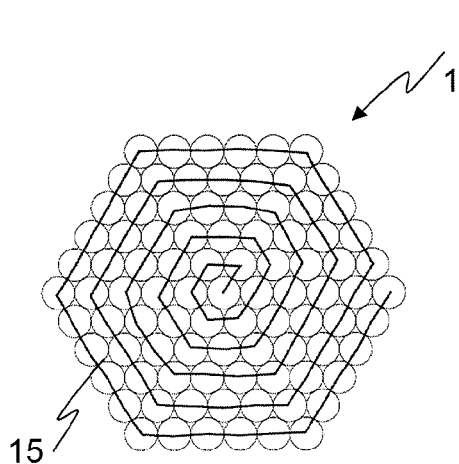
FIG. 15 shows the spiral folding of the linear arrangement shown in FIG. 14 for forming a printing block.
Figure 16:
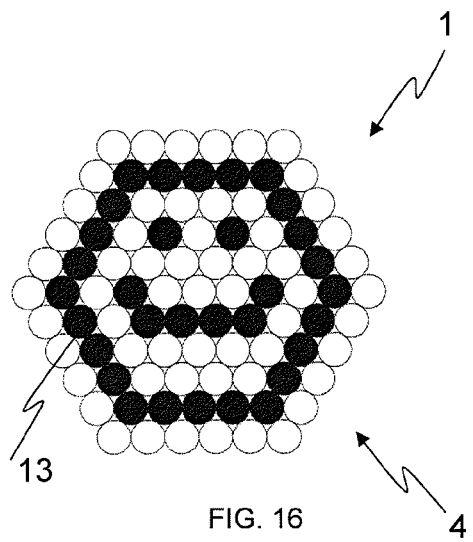
FIG. 16 shows the block formed in FIG. 15, with a printing pattern.

Referring to FIGS. 14, 15 and 16, the block (1) of the present invention can be formed in a linear manner placing the tubes (2, 8) one beside the other, juxtaposed. A printing pattern (13) is configured in said tubes (2, 8), which when being rolled, following a rolling pattern (15) display the printing pattern (13) on the face (4) of the block. Said rolling pattern can be hexagonal, as shown in FIG. 15, or in zigzag, or other one adapted to the printing pattern to be displayed.

Figure 18:
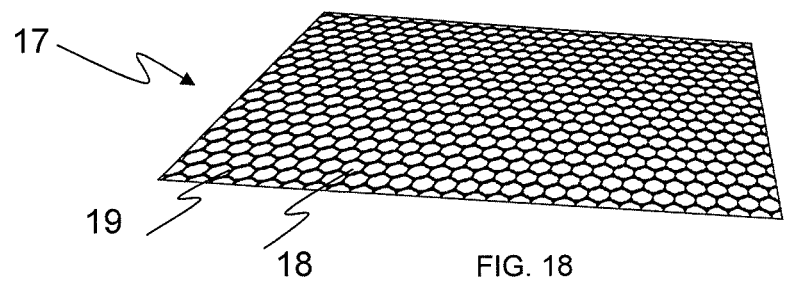
FIG. 18 shows a paper sheet formed of absorbent zones and delimited by non absorbent zones.
Figure 19:
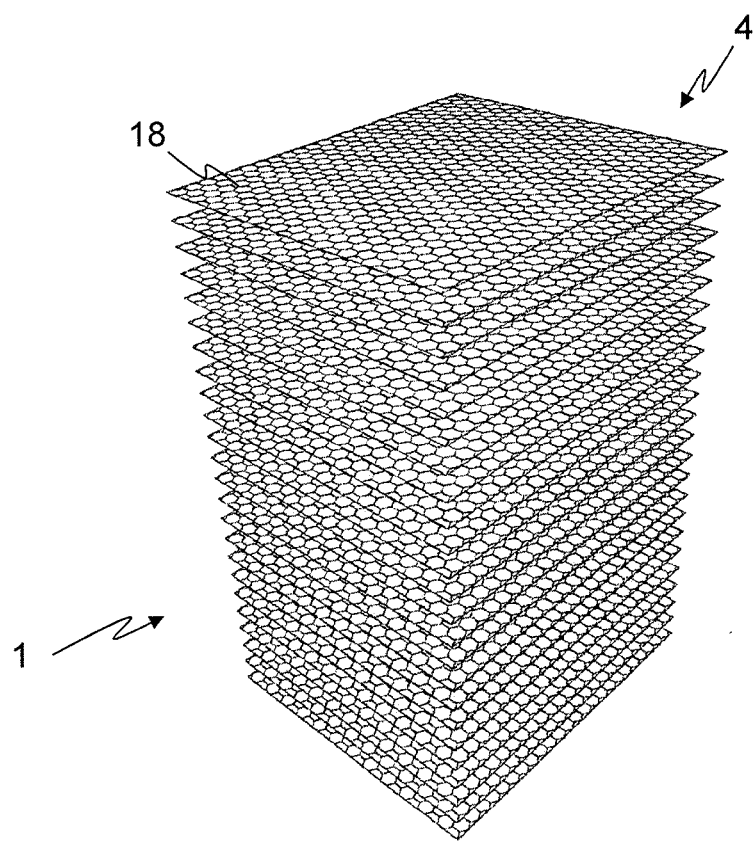
FIG. 19 shows a perspective view of the stacking of a plurality of paper sheets shown in FIG. 18.
Figure 20:
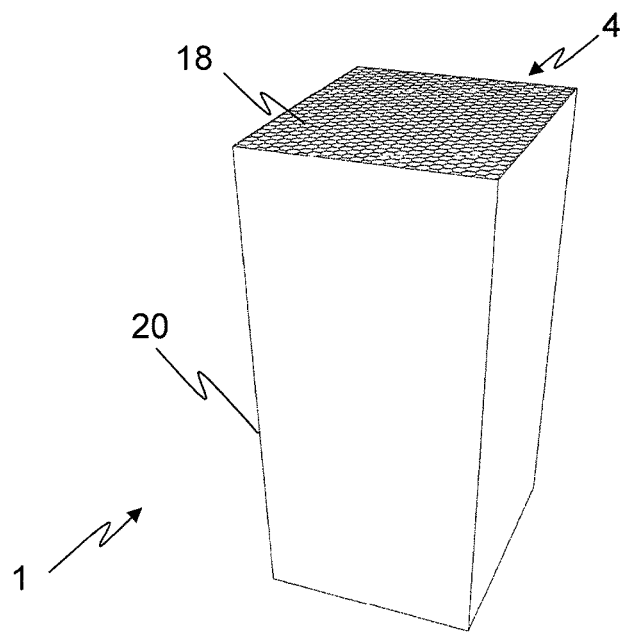
FIG. 20 shows a perspective view of a block formed with the paper sheets shown in FIGS. 18 and 19.

In another embodiment the block can be formed of a stack of paper, which can be of cellulose or polymer origin, as shown in FIGS. 18 to 20. Each paper (17) has a structure formed by a plurality of absorbent zones (18) which are delimited by non absorbent spans (19). A plurality of these paper sheets (17) is stacked and is joined, for example by a casing (20) to form the block of the present invention, thereby leaving a front printing face (4). In this case, the coloring medium (6), which can be ink in this case, is disposed in the absorbent zones (18), which, by capillarity, are distributed toward the paper sheets (17) located at the interior of the block. The coloring medium does not get mixed with another one, because each absorbent zone (18) is delimited by non absorbent spans (19), thus allowing to generate the printing pattern toward the interior of the block (1).

Figure 17:
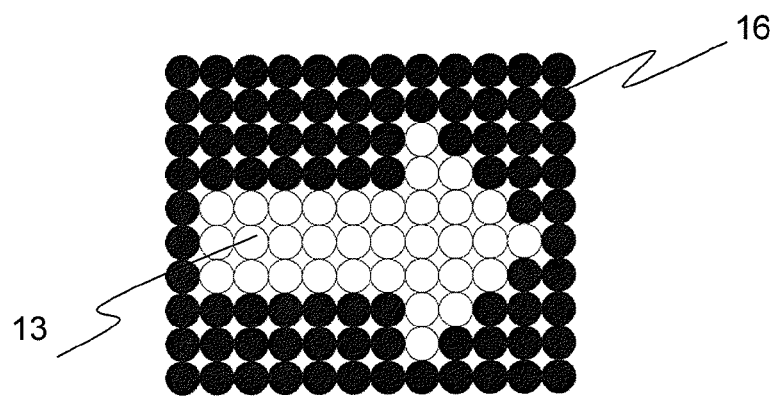
FIG. 17 shows the formation of a three-dimensional printing, made with the block of the present invention, for forming silhouettes of objects or persons in a real size scale.

In another embodiment of the present invention, it is possible to form placards with silhouettes of objects or persons, in a real size scale, for placing them at sales points, for example. In this embodiment, shown in FIG. 17, the contour of the desired silhouette printing in the block (1), the outside spaces (16) of the printing pattern (13) are filled with a substance that weakens the material of the block, so that once the desired zone gets hard, the rest is mechanically removed, it comes off from the hard block, leaving a printing block with the shape of silhouettes of objects or persons in a real size scale, which in FIG. 17 is represented by an arrow to the right. If the block (1) has been formed with plastic material for example, the substance can be a diluent that weakens the walls of the hollow tubes (2) of the outside (16) so that it is easy to pull it off from the shallow tubes (2) that contain the coloring medium for forming the printing pattern (13).

In FIGS. 26 to 31 it is shown a practical formation of the silhouette of a person.

In a block (1) a printing pattern with the shape of the silhouette of a person (13) is formed in the front face (4), wherein the outside spaces (16) of said silhouette of a person (13) have been filled with a substance that weakens the material of the block (1). This block (1) is cut into a plurality of placards (14) and the outside space (16) is easily eliminated by the content of the weakening substance, so as to form a person's silhouette (13) in normal size. This silhouette can be generated of appropriate thickness so that it can be self standing, or it is possible to maintain it standing, by means positioned at the rear part of the real size silhouette. In another embodiment, the block (1) can be formed by a first silhouette of a person in normal position (13a) and the same person in inverted position (13b), wherein the outside spaces (16) of said silhouettes (13a, 13b) have been filled with a substance that weakens the material of the block. Once this block (1) is cut and the outside is removed, both silhouettes (13a, 13b) are folded into an inverted "V" to form a real size self supporting placard.

Figure 22:
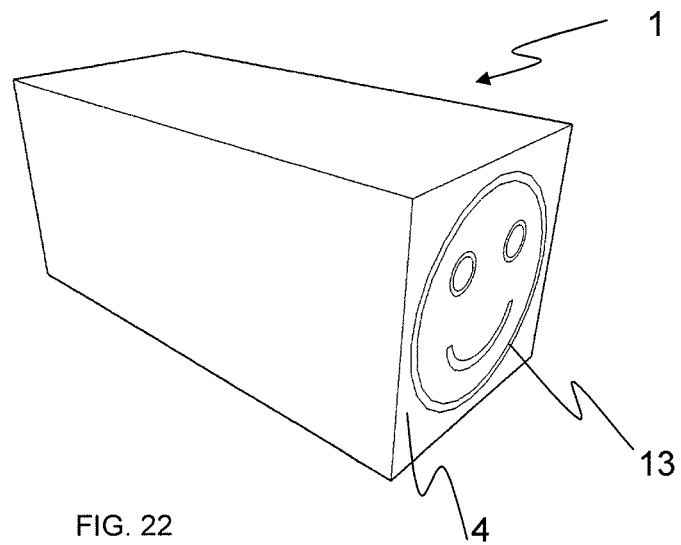
FIG. 22 shows a block of the present invention with a printed pattern.

Referring to FIG. 22, in the front face (4) of the printing block (1), the cavities (3) of the hollow tubes (2) are filled with the colors of the coloring medium (6), or otherwise, the solid tubes (8) are distributed according to the color thereof to form the block (1), wherein the fillings of the cavities (3) with the coloring medium (6) or the distribution per color of the solid tubes (8) follows a printing pattern (13), shown in the example by a face "☺".

Figure 23:
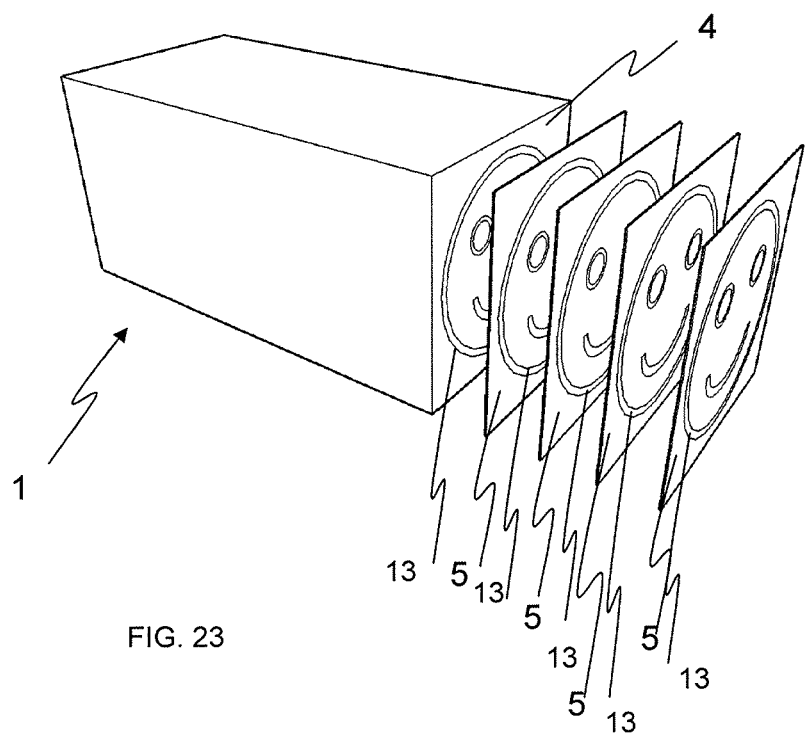
FIG. 23 shows the cutting of the block of FIG. 22 to form printed sheets.

Once the block (1) has been formed and printed with the printing pattern (13), it is transversally cut, parallel to the front print face (4), in a plurality of strips (5), for making posters, placards or advertising banners, among others, according to what is shown in FIG. 23.

Figure 24:
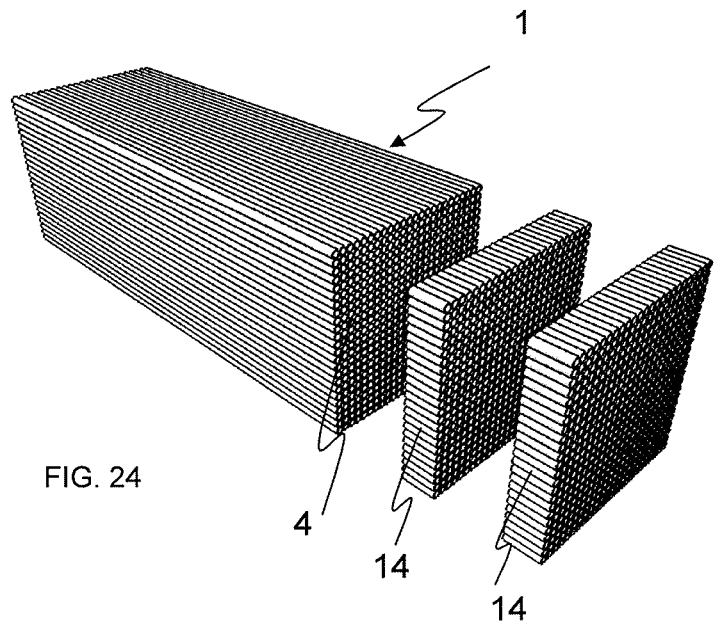
FIG. 24 shows the cutting of the block of FIG. 1 to form printed panels.
Figure 25:
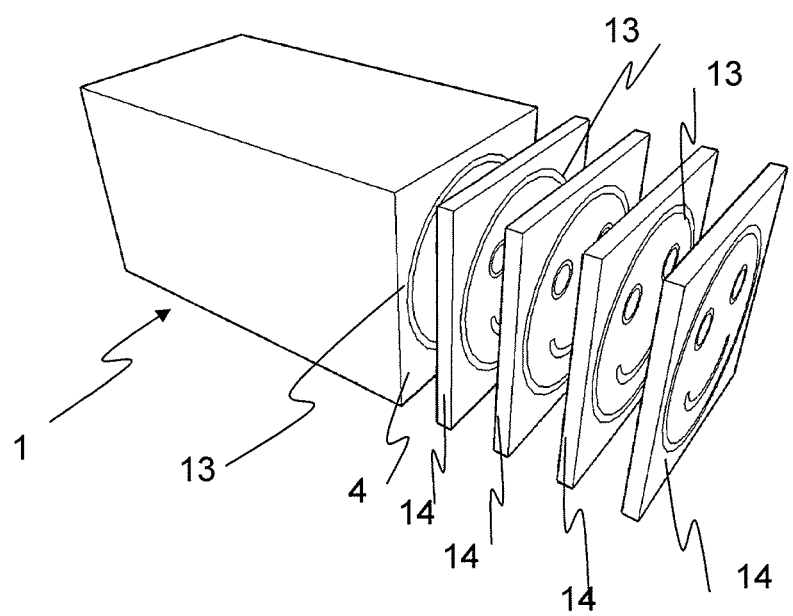
FIG. 25 shows the cutting of the block of FIG. 22 to form printed panels.
Figure 26:
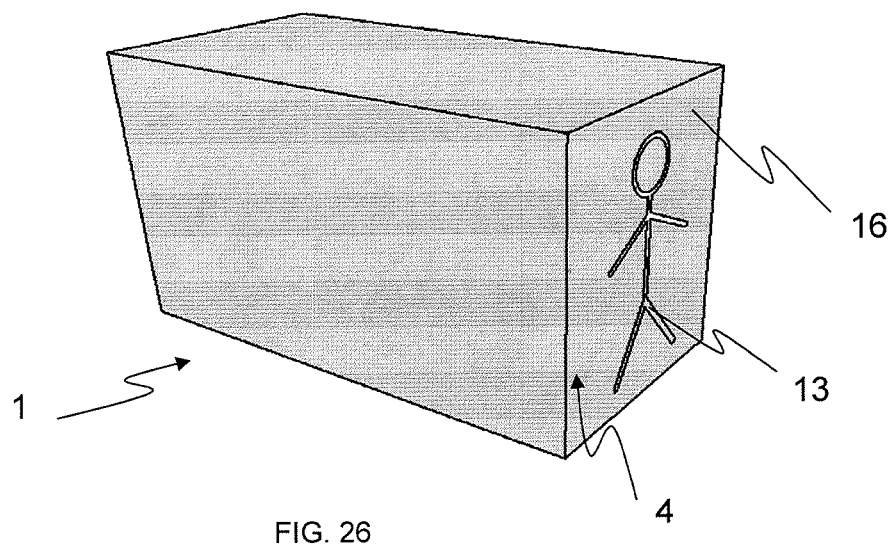
FIG. 26 shows a perspective view of a block of the present invention with a printed pattern with the shape of a silhouette of a person, wherein the spaces outside said silhouette have been filled with a substance that weakens the block material.
Figure 27:
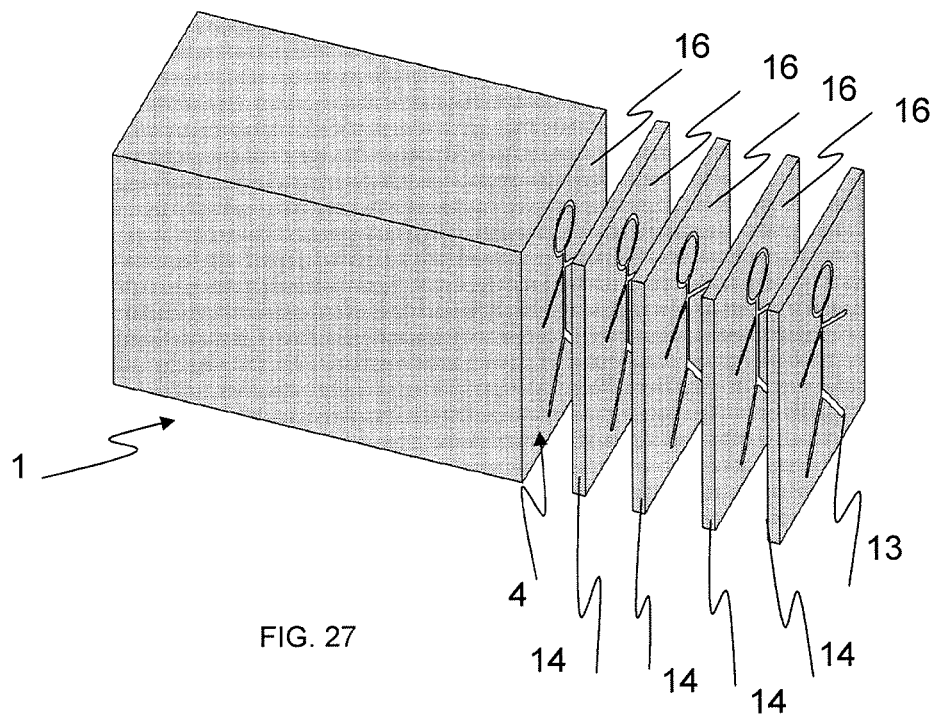
FIG. 27 shows a perspective view of the cutting of the block of FIG. 26, which generates panels to form the silhouette of persons.
Figure 28:
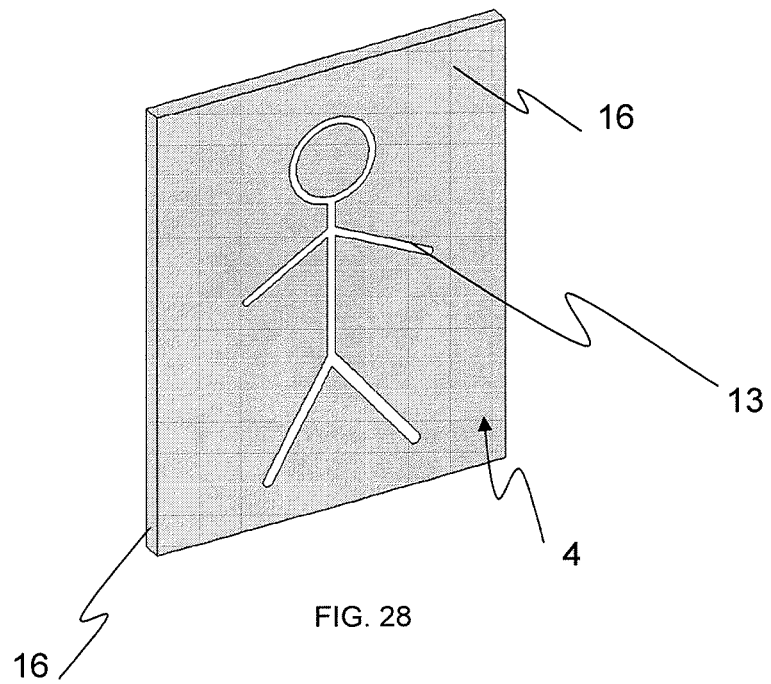
FIG. 28 shows a perspective view of a cut panel of FIG. 27, wherein the material outside of the silhouette is weakened.
Figure 29:
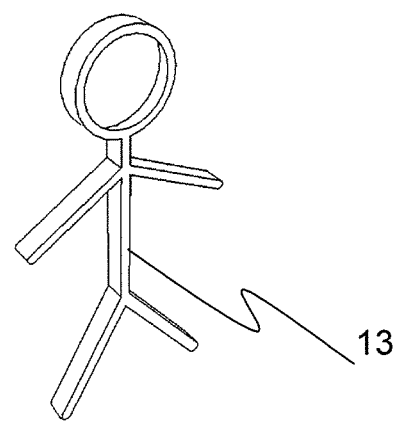
FIG. 29 shows a perspective view of the silhouette of a person formed with the panel of FIG. 28.
Figure 30:
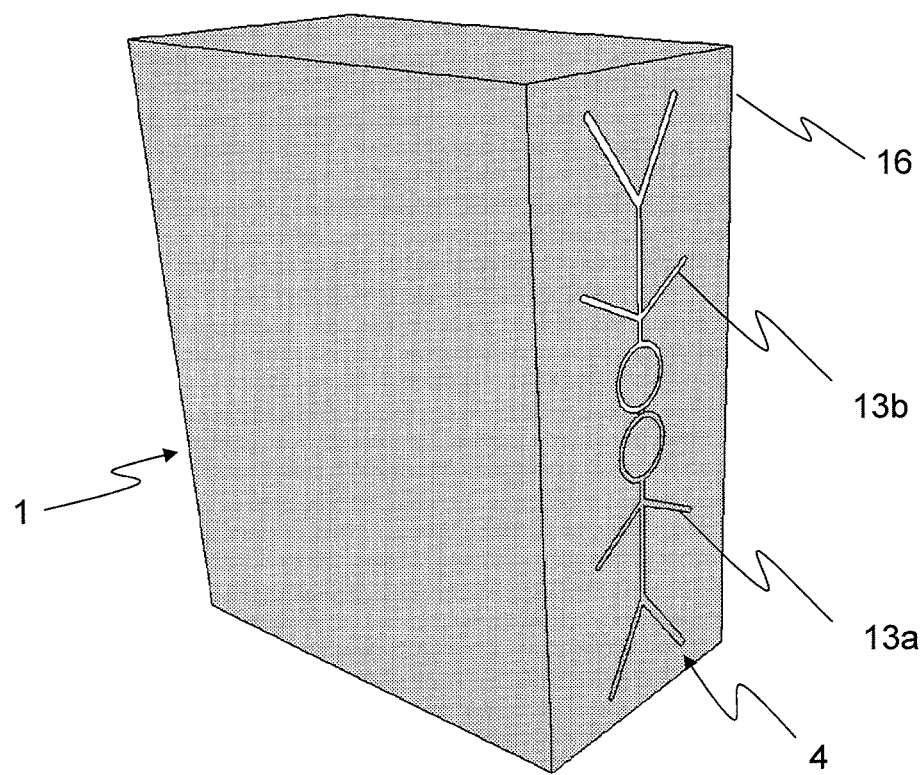
FIG. 30 shows a perspective view of a block of the present invention having a printed pattern with the shape of a first silhouette of a person in normal position and the same person in inverted position, wherein the spaces outside of said silhouettes have been filled with a substance that weakens the block material.
Figure 31:
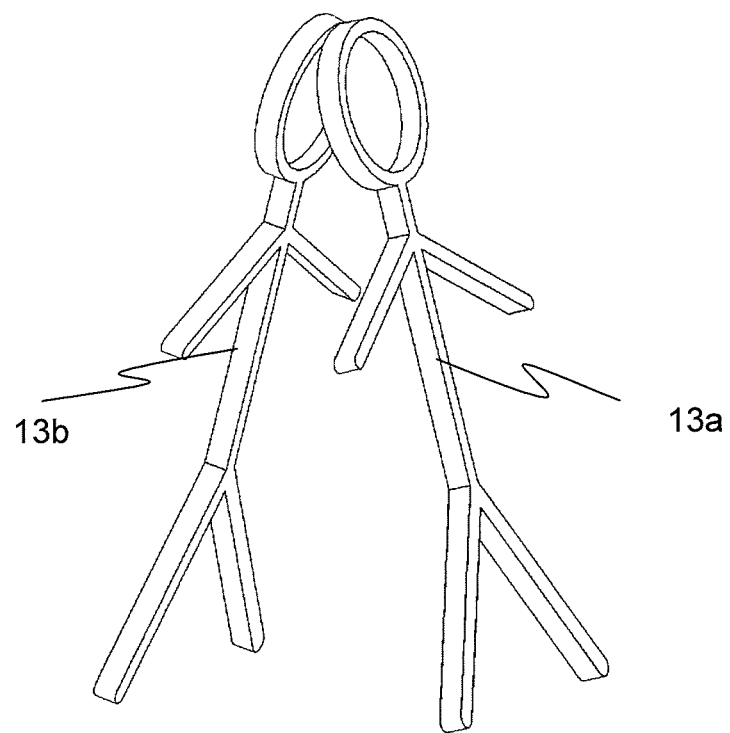
FIG. 31 shows a perspective view of a person's silhouette, formed in a double way, for generating a self supporting placard.

As illustrated in FIGS. 24 and 25, the block (1) can be cut into strips of more thickness, to make up panels (14) having always the same printing pattern (13) printed on their faces.

Figure 32:
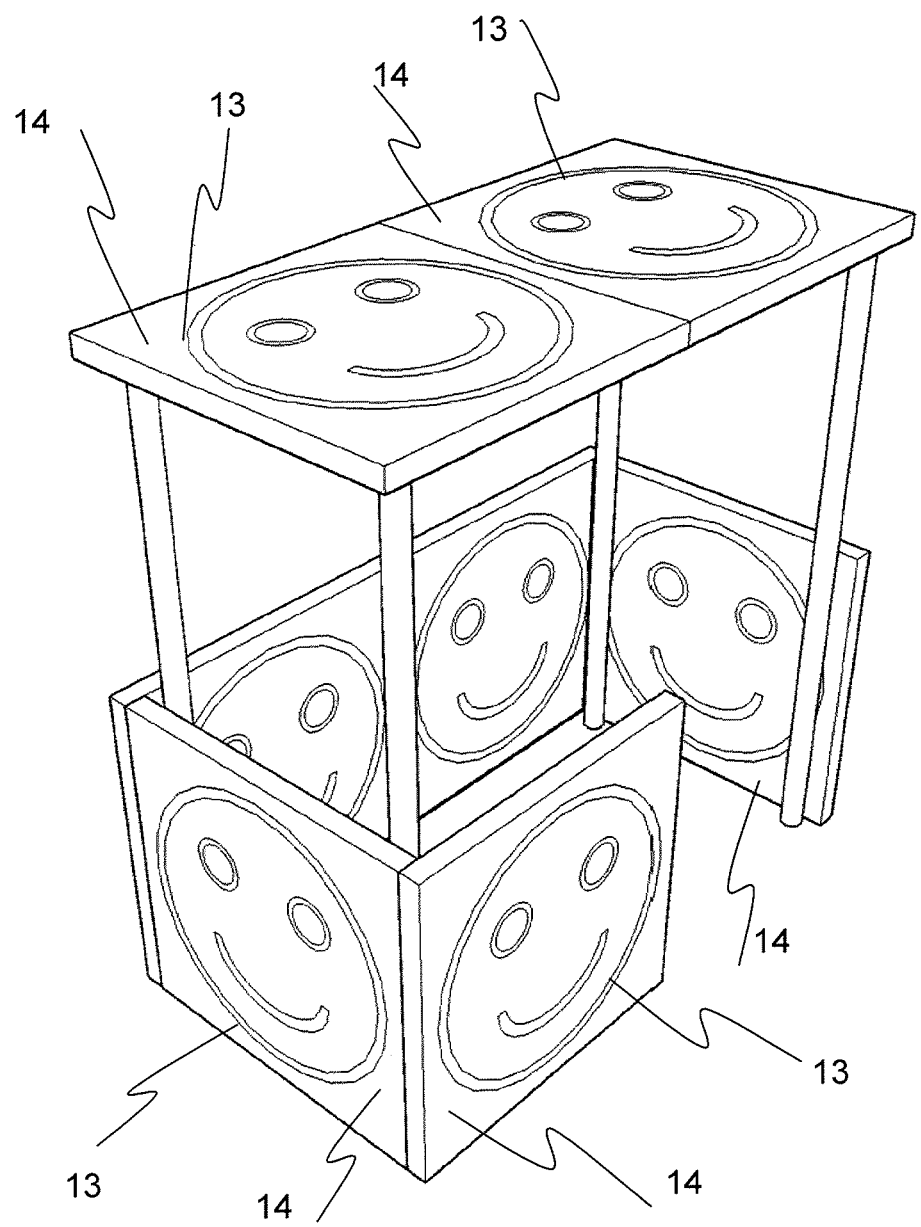
FIG. 32 shows an example of the utilization of the printed blocks of FIG. 25.

These panels (14) are useful for constructing, for example, a display stand or a stand for advertising events, since as they come from the same block and have the same measures, said panels (14) have a modularity effect that has not been achieved up to now in the state of the art. An example of this embodiment of the invention is illustrated in FIG. 32.

Figure 21:
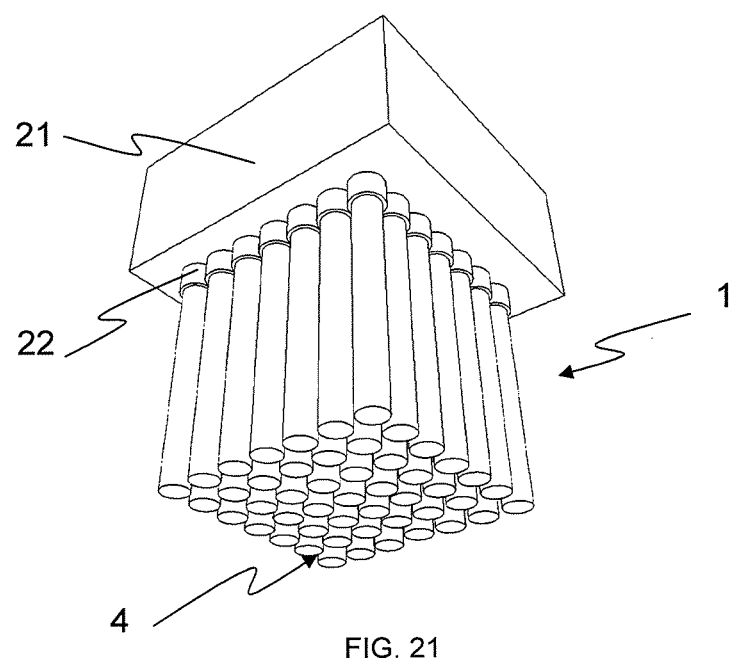
FIG. 21 shows a perspective view of a block formed by an extrusion head.

The block (1) of the present invention can also be formed by extrusion, as shown in FIG. 21. For this purpose, a coloring medium of the paste type, such as for example ink, paint, soft polymer of predetermined colors according to the printing pattern (13), through a plurality of nozzles (22) located in a head (21), wherein said nozzles (22) have a distribution of the front face (4) type. Each nozzle generates a tube (2, 8) of coloring paste, so that when it comes out, for example, by gravity, said tubes (2, 8) are generated separately and then they melt down and they get dry together, generating a block (1) already colored. In this alternative the block is generated when the tubes (2,8) come out of the nozzles, which allows to generate a block (1) of a required length, thereby saving on storage and transportation of the blocks, furthermore diminishing the loss associated with remainders of the material that forms said block.

When the block (1) has been formed by extrusion, as shown in FIG. 21, the printing pattern with the shape of the silhouette of a person (13) is the one that is ejected by the head (21) through the nozzles (22) programmed to that effect. The rest of the nozzles, that would represent the outside spaces (16) of said silhouette (13), would be blocked.

The invention claimed is:

1. A three-dimensional (3D) printing block comprising:
a plurality of solid tubes, each corresponding to a pixel and having a previously selected color;
wherein the plurality of solid tubes is grouped and joined together thereby generating the three-dimensional printing block having to a specified printing pattern comprising the pixels;
wherein the three-dimensional printing block is configured to be transversally cut, parallel to a surface to generate one of a plurality of sheets comprising the specified printing pattern on the surface;
wherein each of the plurality of solid tubes has a tongue and groove means, wherein each tongue and groove means comprises:
male engaging means on two opposite sides or two adjacent sides; and female engaging means on the two corresponding adjacent contrary sides or on the corresponding opposite contrary sides.

2. The three-dimensional printing block according to claim 1, wherein each of the plurality of solid tubes has a square section, thereby generating a layout of aligned columns and rows.

3. The three-dimensional printing block according to claim 1, wherein the plurality of solid tubes are joined together via an adhesive or thermal fusing.

4. The three-dimensional printing block according to claim 1, wherein the solid tubes are colored fibers.

* * * * *